United States Patent [19]

Teremachi

[11] Patent Number: 4,778,284
[45] Date of Patent: Oct. 18, 1988

[54] LIGHT-WEIGHT TYPE LINEAR BALL BEARING

[76] Inventor: Hiroshi Teremachi, 2-34-8, Higashi-Tamagawa, Setagaya-Ku, Tokyo, Japan

[21] Appl. No.: 133,536

[22] Filed: Dec. 16, 1987

[30] Foreign Application Priority Data

Dec. 19, 1986 [JP] Japan .................... 61-301307

[51] Int. Cl.⁴ .................................... F16C 29/06
[52] U.S. Cl. .................................... 384/45
[58] Field of Search .................... 384/43, 45

[56] References Cited

U.S. PATENT DOCUMENTS

| | | | |
|---|---|---|---|
| 4,582,371 | 4/1986 | Mottate | 384/45 |
| 4,647,226 | 3/1987 | Mottate | 384/45 |
| 4,701,057 | 10/1987 | Kashiwabara | 384/45 |
| 4,701,058 | 10/1987 | Mottate | 384/45 |

Primary Examiner—Stuart S. Levy
Assistant Examiner—Thomas R. Hannon
Attorney, Agent, or Firm—Kenyon & Kenyon

[57] ABSTRACT

A light-weight linear ball bearing includes an outer casing made of a flat, thin steel plate and having a substantially U-shaped cross-sectional form, an inner casing fitted into the outer casing and having a substantially U-shaped cross-sectional form, and a ball casing made of a flat material. The inner casing is made of a flat, thin steel plate and has flange portions and a central flat portion formed by bending the lateral edge portions of the steel plate with the exception of the two longitudinal end portions thereof. The ball casing has: flat mounting portions formed at the two longitudinal ends thereof, side wall portions engaged with the inner surfaces of the lateral flange portions of the inner casing; and a central wall portion which forms non-loaded ball circulating grooves in cooperation with the side wall portions. The ball casing has ball rolling direction changing grooves formed at the longitudinal ends of each of the side wall portions. The upper surfaces of the two side wall portions, the central wall portion and the two mounting portions of the ball casing are in the same plane. When the outer casing, the inner casing, and the ball casing are assembled, the upper surfaces of the two side wall portions, the central wall portion and the two end mounting portions of the ball casing are closely fitted to the central flat portion and two end mounting portions of the inner casing, thereby enabling endless circulating passages to be formed by the non-loaded ball circulating grooves, the ball rolling direction changing grooves and by the flat portions of the inner casing.

4 Claims, 5 Drawing Sheets

LIGHT-WEIGHT TYPE LINEAR BALL BEARING

BACKGROUND OF THE INVENTION

1. Field of the Invention:

The present invention relates to a light-weight type linear ball bearing, and more particularly, to a light-weight type linear ball bearing suitable for use in small-size machines with a relatively small load, such as the sliding sections of various types of optical measuring instruments or small-size electronic computers.

2. Description of the Prior Art:

A known light-weight type endless linear motion ball bearing made of a thin steel plate which is pressed into a predetermined shape by utilizing plastic deformation is disclosed, for example, in the specification of Japanese Patent Laid-Open No. 136018/1986.

FIGS. 10 and 12 are respectively perspective and cross-sectional views of a known light-weight linear ball bearing. In the figure, a bed 1 serving as an outer casing is made of a thin steel plate pressed into a shape having flange portions along its two lateral edges. A table 2 serving as an inner casing is also made of a thin steel plate pressed into a similar shape having flange portions along its two lateral edges. The opposing surfaces of the two flange portions of the bed 1 and the table 2 are provided with track grooves 1a and 2a, respectively. Between the bed 1 and the table 2, an upper lid 5 and a retainer 6 are fixed to a lower lid 5 in which ball rolling direction changing passages and return passages 5b are formed as one unit in such a manner that a large number of balls 3 can be rolled therethrough.

In a ball bearing arranged in the manner described above, since the upper lid 5 is incorporated between the table 2 and the lower lid 5 so as to form one wall of the ball rolling passages and prevent escape of the balls, the table 2 is located at a higher position when the ball bearing is assembled, i.e., the distance H between the upper surface of the table 2 and the center of the loaded balls 3 is increased by a value which corresponds to the thickness of the upper lid 4, as shown in FIG. 11, thereby increasing the moment caused by the lateral loads applied to the table 2 and adversely influencing the rigidity of the table 2.

The retainer 6 is also disposed within the bed 1 in such a manner as to prevent the loaded balls 3 from escaping from the ball rolling grooves 1a and 2a. The retainer 6 has a shape such as that shown in FIG. 12. The provision of the retainer 6 increases the number of parts, the working processes of pressing and assembly, and the production cost.

FIG. 13 shows the structure of another type of known linear ball bearing which lacks the retainer 6. In this ball bearing, the upper lid 4 and the lower lid 5 have extended portions 4a and 5a, respectively, and the distal ends of the extended portions 4a and 5a located on each side of the upper lid 4 and the lower lid 6 are provided with inner protrusions 4b and 5b, respectively, which allows them retain the loaded balls 3 without the retainer.

However, this structure also fails to eliminate the need for the upper lid 4, and therefore cannot solve the problem involving the rigidity of the table 2 in relation to the lateral loads.

SUMMARY OF THE INVENTION

In view of the above-described problems of the prior art, an object of the present invention is to provide a light-weight type linear ball bearing which enables an upper lid and a retainer to be eliminated so that the number of required parts can be reduced, and which enables the distance between the surface of a table and the center of loaded balls to be minimized so as to ensure sufficient rigidity with respect to the lateral loads applied to the table, to enable the ball bearing to be used for long periods of time, to minimize the level of noise, and to enable it to be produced at minimal cost.

To achieve the above-described object, the present invention provides a light-weight type linear ball bearing which comprises an outer casing made of a flat, thin steel plate and having a substantially U-shaped cross-sectional form, the outer casing having flange portions formed by bending the two lateral edge portions of the steel plate, the opposing inner surfaces of the flange portions being provided with parallel ball rolling grooves; an inner casing made of a flat, thin steel plate and having flange portions and a central flat portion formed by bending the lateral edge portions of the steel plate with the exception of the two longitudinal end portions thereof, the two longitudinal end portions forming flat mounting portions, and the outer surfaces of the flange portions having parallel ball rolling grooves; and a ball casing made of a flat material and having flat mounting portions formed at the two longitudinal ends thereof, side wall portions engaged with the inner surfaces of the lateral flange portions of the inner casing, and a central wall portion which forms non-loaded ball circulating grooves in cooperation with the side wall portions, the ball casing having ball rolling direction changing grooves formed at the longitudinal ends of each of the two side wall portions in such a manner that they are coupled to the non-loaded ball circulating grooves, wherein the upper surfaces of the two side wall portions, the central wall portion and the two end mounting portions of the ball casing are in the same plane, and when the outer casing, the inner casing, and the ball casing are assembled, the upper surfaces of the two side wall portions, the central wall portion and the two end mounting portions of the ball casing are closely fitted to the central flat portion and two end mounting portions of the inner casing, thereby enabling endless circulating passages to be formed by the non-loaded ball circulating grooves, the ball rolling direction changing grooves and by the flat portions of the inner casing.

DESCRIPTION OF THE PREFERRED EMBODIMENTS

Figure 2:
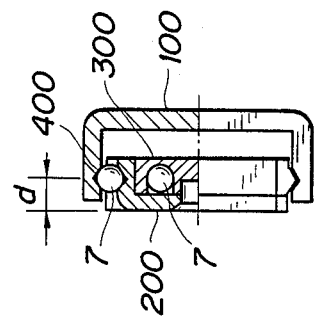
FIG. 2 is a cross-section taken along the line of A—A of FIG. 1.
Figure 4:
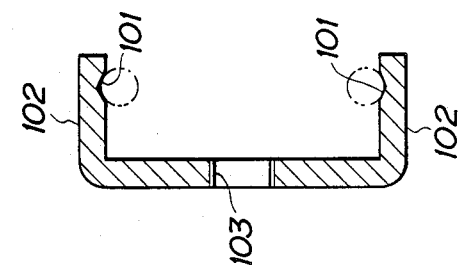
FIG. 4 is a cross-section taken along the line B—B of FIG. 3.
Figure 3:
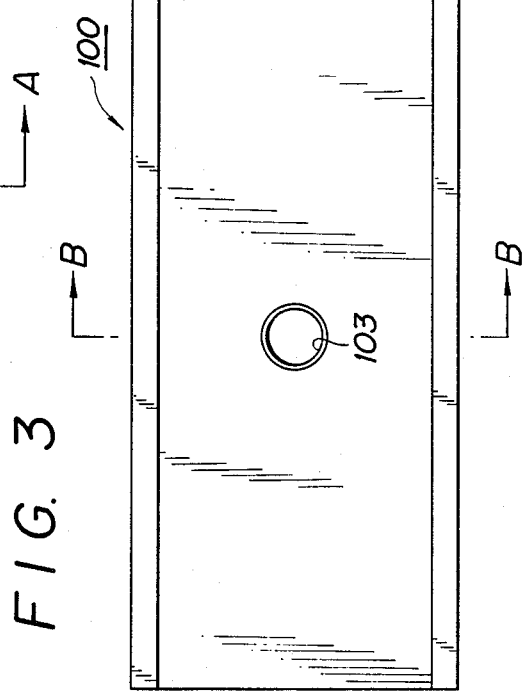
FIG. 3 is a plan view of an outer casing incorporated in the linear ball bearing of FIG. 1.

Referring to FIGS. 1 to 9, an outer casing 100 (which corresponds to the bed in the ball bearing shown in FIG. 10) is manufactured in the manner described below and illustrated in FIGS. 3 and 4 using a thin steel plate: ball rolling grooves 101 are formed in the vicinities of the lateral edges of the steel plate in such a manner that they run parallel to each other in the longitudinal direction utilizing plastic deformation thereof. Subsequently, the steel plate is bent at the lateral edge portions into a substantially U-shaped cross-sectional form by a press so as to form two flange portions 102 of the outer casing 100. At this time, the ball rolling grooves 101 are disposed on the opposing inner surfaces of the flange portions 102. A plurality of holes 103 are formed in the portion of the thin steel plate which forms the back of the outer casing 100 when the plate is formed into an outer casing. The holes 103 passes bolts therethrough when the linear ball bearing is mounted on an instrument. Thereafter, the ball rolling grooves 101 are grounded by a grind stone.

Figure 7:
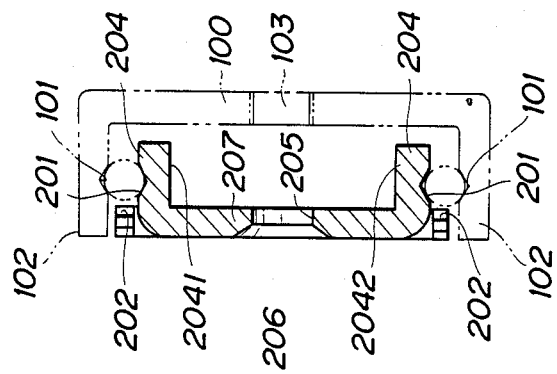
FIG. 7 is a cross-section taken along the line of C—C of FIG. 5.
Figure 5:
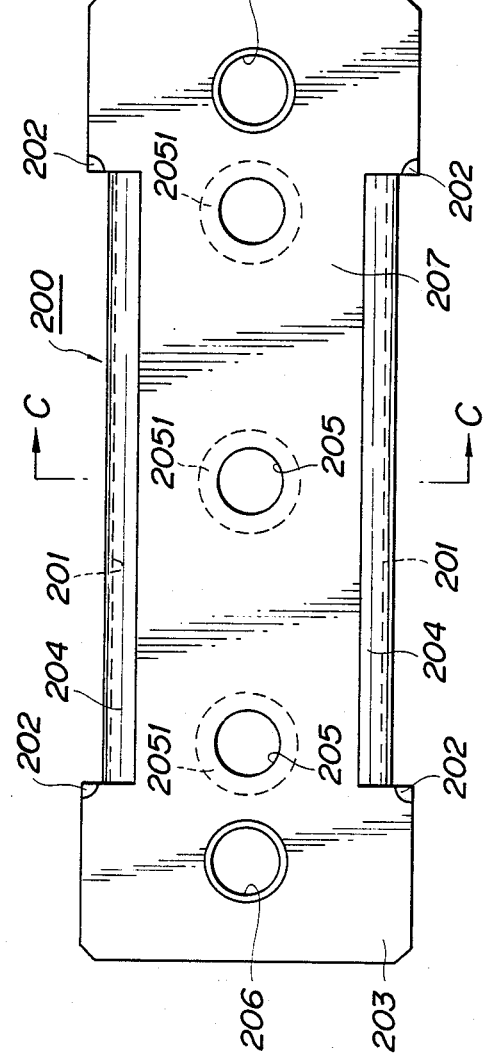
FIG. 5 is a plan view of an inner casing incorporated in the linear ball bearing of FIG. 1.
Figure 6:
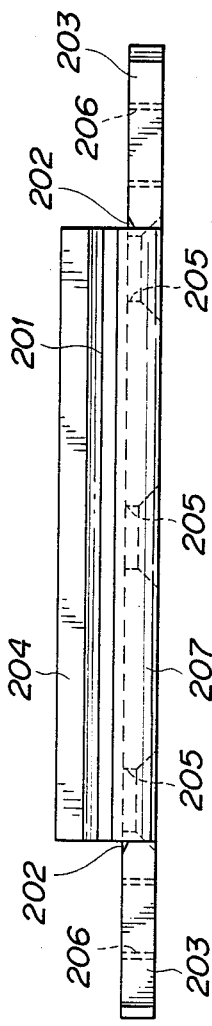
FIG. 6 is a side elevational view of the inner casing of FIG. 5.

An inner casing 200 (which corresponds to the table in the ball bearing shown in FIG. 10) is also made of a thin steel plate, as shown in FIGS. 5 to 7. First, parallel ball rolling grooves 201 are formed by a press at the positions of the steel plate at which the grooves 201 face the corresponding ball rolling grooves 101 when the inner casing 200 is fitted into the outer casing 100. Subsequently, ball scooping portions 202 are formed at the eges of flat portions 203 left at the two longitudinal end portions of the plate, and the two inner edge portions of the steel plate are then bent in such a manner that the plate has a substantially U-shaped cross-sectional form so as to form flange portions 204 and a cetral flat surface 207 and hence the inner casing 200 having a substantially U-shaped cross-sectional configuration. The rolling grooves 201 are grounded by a grind stone thereafter.

As shown in FIGS. 5 to 7, the central flat portion 207 of the inner casing 200 has a plurality of through-holes 205 through which engaging pins are passed when a ball casing 300 to be described later is mounted on the inner casing 200. The through-holes 205 have a counter sinking form. Each of the flat portions 203 located at two longitudinal end portions of the inner casing 200 is provided with a hole 206.

Figure 9:
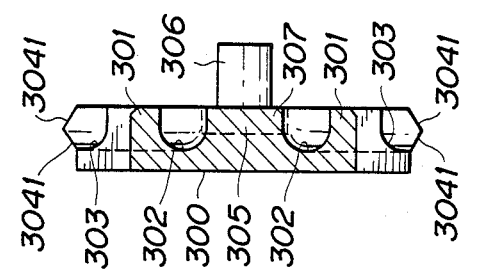
FIG. 9 is a cross-section taken along the line of D—D of FIG. 8.
Figure 8:
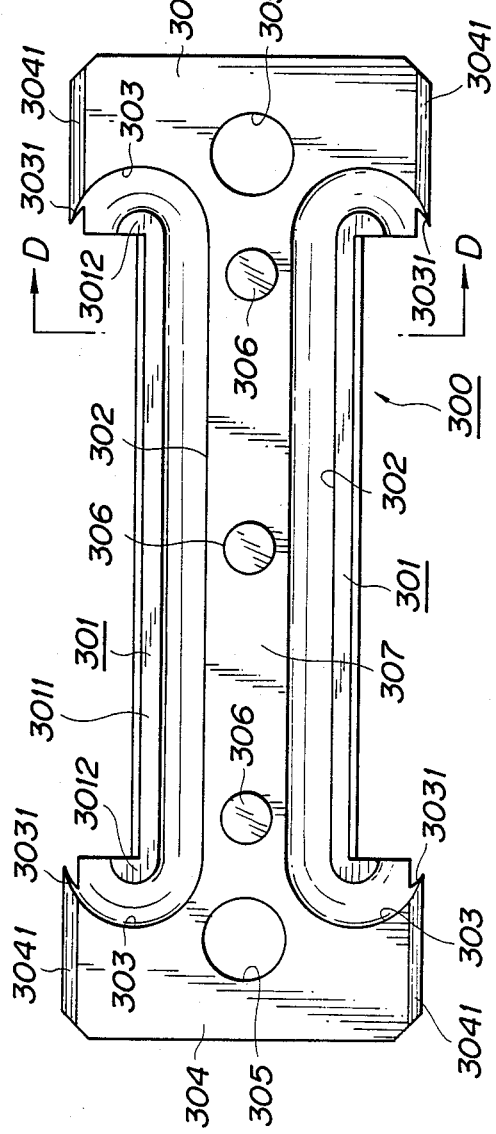
FIG. 8 is a plan view of a ball casing incorporated in the linear ball bearing of FIG. 1.
Figure 10:
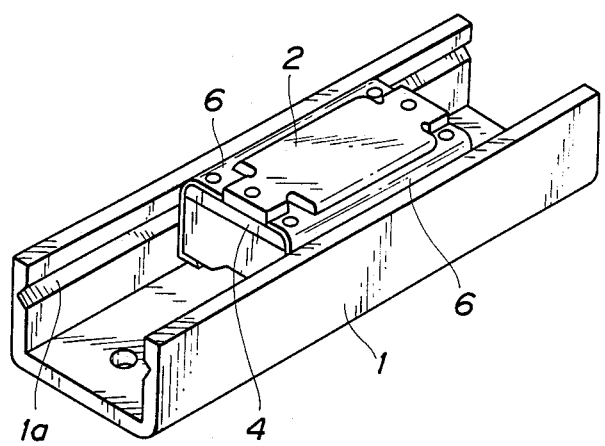
FIGS. 10 to 13 show a known light-weight, endless linear-motion type ball bearing.
Figure 11:
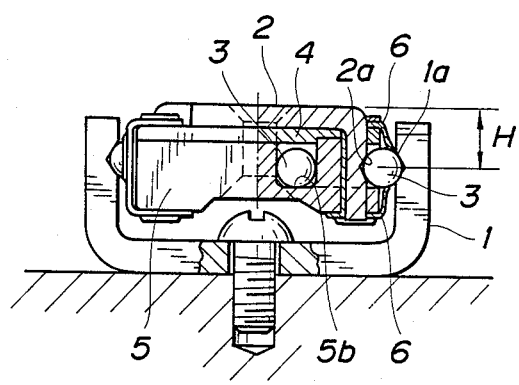
Figure 12:
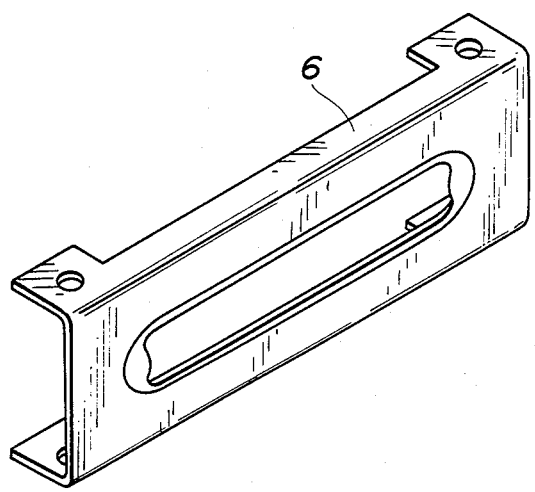
Figure 13:
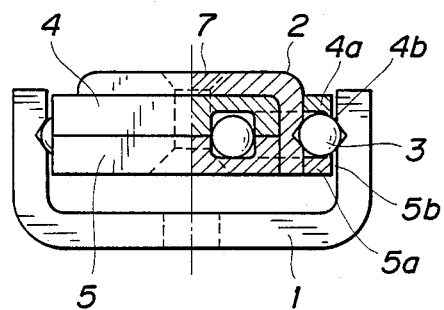

The ball casing 300 fitted into the inner casing 200 is made of a heat-resistant, wear-resistant and lubricating plastic by an injection molding machine. As shown in FIGS. 8 and 9, the ball casing 300 has wall portions 301 which are fitted to inner surfaces 2041 and 2042 of the flange portions 204 of the inner casing 200, respectively, when the ball casing is fitted into the inner casing 200. Each of the wall portions 301 consists of a horizontal portion 3011 and a curved portion 3012. As shown in FIG. 8, a non-loaded ball circulating groove 302 having a slightly larger curvature than the diameter of balls 7 is formed on the inner side of each of the wall portions 301 in the longitudinal direction. A ball rolling direction changing groove 303 which is coupled to the non-loaded ball circulating groove 302 is formed at each longitudinal end of each of the wall portions 301. The distal end of each of the ball rolling direction changing grooves 303 may be provided with a ball scooping tongue piece 3031 which allows the balls to be rolled accurately, if necessary.

The inner casing 300 also has flat portions 304 at the two longitudinal ends thereof, and the two edges of each of the flat portions 304 in which the ball rolling direction changing grooves 303 coupled to the non-loaded ball circulating grooves 302 are formed are provided with inclined surfaces 3041 having a substantially triangular cross-sectional form. The flat portion 304 also has a recess 305. A central wall portion 307 formed between the two non-loaded ball circulating grooves 302 is provided with a plurality of positioning pins 306 which are inserted into the through-holes 205 formed in the inner casing 200 and are fixed thereat by a suitable means such as melt caulking when the ball casing 300 is fitted into the inner casing 200. The central wall portion 307, the side wall portions 301, and the flat portions 304 are formed on the same plane.

Figure 1:
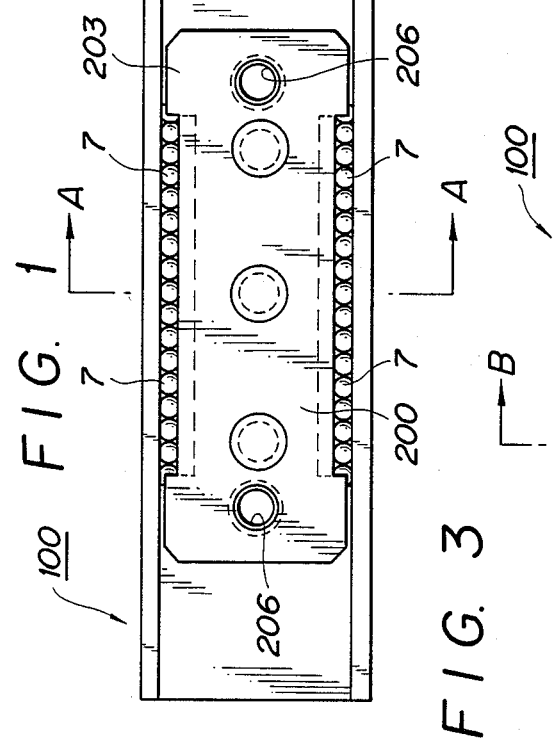
FIG. 1 is a plan view of a light-weight linear ball bearing according to the present inventin.

The above-described outer casing 100, the inner casing 200, and the ball casing 300 are assembled to form a light-weight type linear ball bearing of the present invention. FIGS. 1 and 2 are plan and cross-sectional views of the ball bearing.

As shown in FIGS. 1 and 2, in the light-weight type linear ball bearing according to the present invention, the engaging pins 306 mounted on the ball casing 300 are tightly fitted into the through-holes 205 formed in the inner casing 200, enabling the side wall portions 301, the central wall portion 307, and the flat portions 304 of the ball casing 300 to be closely fitted to the central flat portion 207 and the two mounting portions 203 of the inner casing 200. This structure enables the need for a member such as the upper lid employed in the known ball bearing shown in FIGS. 10-13 to be eliminated. This also enables the distance d (FIG. 2) between the center of non-loaded balls 7 and the outer surface of the inner casing 200 to be reduced when compared with the conventional ball bearing. Such a ball bearing also displays adequate rigidity in the face of the lateral loads that are applied to the inner casing.

In the ball bearing of this invention, since the ball rolling direction changing grooves and the non-loaded ball circulating grooves are continuously formed in the ball casing and non-loaded ball circulating passages are formed in cooperation with these grooves and the central flat portion of the inner casing, the loaded balls can be rolled quietly and smoothly without the use of a supporting member such as a retainer.

Further, since the outer and inner casings for supporting the loaded balls are made of a thin steel plate which has sufficient strength and elasticity and the ball casing for guiding the non-loaded balls is made of plastic as one unit, the entirety of the ball bearing can be made thin, making the ball bearing functional and economical.

Further, since the ball casing is formed of plastic as one unit, the balls can be smoothly passed through the non-loaded ball circulating grooves with a minimal level of noise.

If the distal end of each of the ball rolling direction changing grooves is provided with a tongue piece, the loaded balls may be scooped by this tongue piece and transferred smoothly from the non-loaded ball circulating passage to the loaded ball grooves, minimizing the level of noise.

What is claimed is:

1. A light-weight linear ball bearing comprising:
   an outer casing made of a flat, thin steel plate and having a substantially U-shaped cross-sectional form, said outer casing having flange portions formed by bending the two lateral edge portions of said steel plate, the opposing inner surfaces of said flange portions being provided with parallel ball rolling grooves;
   an inner casing fitted into said outer casing and having a substantially U-shaped cross-sectional form, said inner casing being made of a flat, thin steel plate and having flange portions and a central flat portion formed by bending the lateral edge portions of said steel plate with the exception of the two longitudinal end portions thereof, said two longitudinal end portions forming flat mounting portions, and the outer surfaces of said flange portions having parallel ball rolling grooves; and
   a ball casing made of a flat material and having: flat mounting portions formed at the two longitudinal ends thereof, side wall portions engaged with the inner surfaces of said lateral flange portions of said inner casing; and a central wall portion which forms non-loaded ball circulating grooves in cooperation with said side wall portions, said ball casing having ball rolling direction changing grooves formed at the longitudinal ends of each of said side wall portions in such a manner that they are coupled to said non-loaded ball circulating grooves:
   wherein the upper surfaces of said two side wall portions, said central wall portion and said two mounting portions of said ball casing are in the same plane, and when said outer casing, said inner casing, and said ball casing are assembled, said upper surfaces of said two side wall portions, said central wall portion and said two end mounting portions of said ball casing are closely fitted to said central flat portion and two end mounting portions of said inner casing, thereby enabling endless circulating passages to be formed by said non-loaded ball circulating grooves, said ball rolling direction changing grooves and by the flat portions of said inner casing.

2. A linear ball bearing according to claim 1, wherein said ball casing is formed of plastic as one unit.

3. A linear ball bearing according to claim 1, wherein said flat portion of said inner casing formed between said lateral flange portions is provided with a plurality of holes, and said central wall portion of said ball casing is provided with a plurality of engaging pins which are fitted into said plurality of holes when said inner casing and said ball casing are fitted to each other.

4. A linear ball bearing according to claim 1, wherein the distal end of each of said ball rolling direction changing grooves of said ball casing has a ball scooping tongue piece.

* * * * *